United States Patent
Dinavahi et al.

(10) Patent No.: US 12,306,795 B2
(45) Date of Patent: May 20, 2025

(54) EFFICIENT LOCALIZED METADATA HANDLING

(71) Applicant: SAP SE, Walldorf (DE)

(72) Inventors: Sirisha Dinavahi, Telangana (IN); Arpitha A. Shetty, Dakshina Kannada (IN); Rakesh Kelappan, Wayanad (IN); Devicharan Vinnakota, Bengaluru (IN); Amrita Prabhakaran, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/365,608

(22) Filed: Aug. 4, 2023

(65) Prior Publication Data

US 2025/0045250 A1     Feb. 6, 2025

(51) Int. Cl.
*G06F 16/17*     (2019.01)
*G06F 16/2455*   (2019.01)
*G06F 16/2457*   (2019.01)

(52) U.S. Cl.
CPC ...... *G06F 16/173* (2019.01); *G06F 16/24552* (2019.01); *G06F 16/24575* (2019.01)

(58) Field of Classification Search
CPC .............. G06F 16/173; G06F 16/24552; G06F 16/24575
See application file for complete search history.

(56) References Cited

U.S. PATENT DOCUMENTS

| | | | |
|---|---|---|---|
| 10,732,852 B1* | 8/2020 | Ma | G06F 3/0641 |
| 2007/0208569 A1* | 9/2007 | Subramanian | G10L 19/0018 |
| | | | 704/E19.007 |
| 2010/0205475 A1* | 8/2010 | Ebrahimi | G06F 21/62 |
| | | | 715/764 |
| 2016/0162478 A1* | 6/2016 | Blassin | G06Q 10/063112 |
| | | | 706/12 |
| 2019/0236598 A1* | 8/2019 | Padmanabhan | G06Q 20/389 |
| 2020/0285638 A1* | 9/2020 | Burceanu | G06F 40/253 |

* cited by examiner

*Primary Examiner* — Angelica Ruiz
(74) *Attorney, Agent, or Firm* — Fountainhead Law Group, PC

(57) ABSTRACT

Embodiments implement efficient localized handling of metadata in connection with the retrieval of data from a remote source. A request including content, is received by a localization engine. In response to the request and based upon the content, only a portion of metadata relevant to the request is initially retrieved from the remote source. Remaining metadata relevant to the query, is only retrieved later according to execution of background jobs. One example relates to language translation in connection with querying of a remote source. Based upon a locale of the user posing the query, only metadata relevant to that particular locale (e.g., Germany) is returned immediately. Metadata relevant to languages of users residing in locales other than the current user (e.g., USA; France), is only returned later according to background jobs. Thus contact with a remote source does not serve as a bottleneck to efficient performance of local activities.

17 Claims, 14 Drawing Sheets

FIG. 4

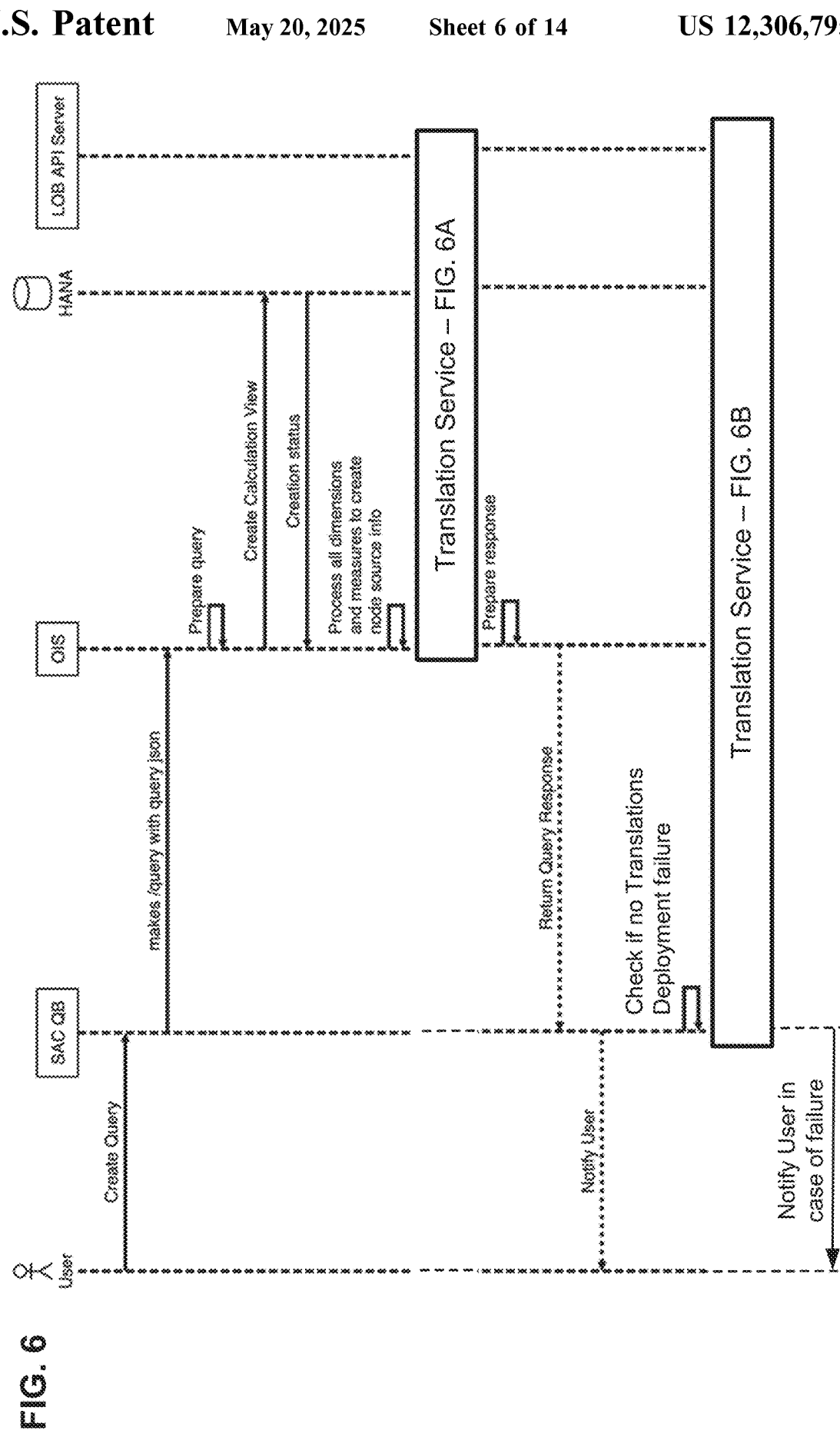

FIG. 8
Table Structure

| Column name | Data type | Constraints |
|---|---|---|
| customer_tenant_id | NVARCHAR | Primary Key |
| source_tenant_id | NVARCHAR | Primary Key |
| query_id | NVARCHAR | Primary Key |
| version | NVARCHAR | Primary Key |
| modification_type | NVARCHAR | Primary Key |
| status_type | NVARCHAR | Primary Key |
| status_value | INTEGER | |
| last_modified_by | NVARCHAR | |
| last_modified_at | Timestamp | |

FIG. 9
Translation Scenario status_type - TRANSLATION_UPLOAD

| status_value | -1 (IN_PROGRESS) | 1 (SUCCESSFUL) | 0 (FAILURE) |
|---|---|---|---|

EFFICIENT LOCALIZED METADATA HANDLING

BACKGROUND

Unless otherwise indicated herein, the approaches described in this section are not prior art to the claims in this application and are not admitted to be prior art by inclusion in this section.

Computer systems are increasing evolving to leverage remote computational and/or memory resources (located, e.g., on the cloud). While offering convenience for a user, such approaches can introduce time delays and increase cost.

For example, users of remote software may be located in a variety of places, and speak different local human languages. It may be challenging for a remotely-located system, to efficiently interact with users across a plurality of different human languages.

SUMMARY

Embodiments implement efficient localized handling of metadata in connection with the retrieval of data from a remote source. A request including content, is received by a localization engine. In response to the request and based upon the content, only a portion of metadata relevant to the request is initially retrieved from the remote source. Remaining relevant metadata is retrieved later according to the execution of job(s) in the background. One example relates to language translation in connection with querying of a remote source. Based upon a locale of the user posing the query, only metadata relevant to that particular locale (e.g., Germany) is returned immediately. Metadata relevant to languages of users residing in locales other than the current user (e.g., USA: France), is only returned later according to jobs being executed in the background. In this manner, contact with a remote source does not serve as a bottleneck to efficient performance of activities occurring locally.

The following detailed description and accompanying drawings provide a better understanding of the nature and advantages of various embodiments.

BRIEF DESCRIPTION OF THE DRAWINGS

FIG. 4 shows a simplified screenshot of a profile page according to the example.

FIG. 6 is a simplified flow diagram for metadata localization under one scenario according to the example.

FIG. 8 shows a table structure for the query status repository in the example.

FIG. 9 shows a table structure for a translation scenario.

DETAILED DESCRIPTION

Described herein are methods and apparatuses that implement localized metadata handling. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
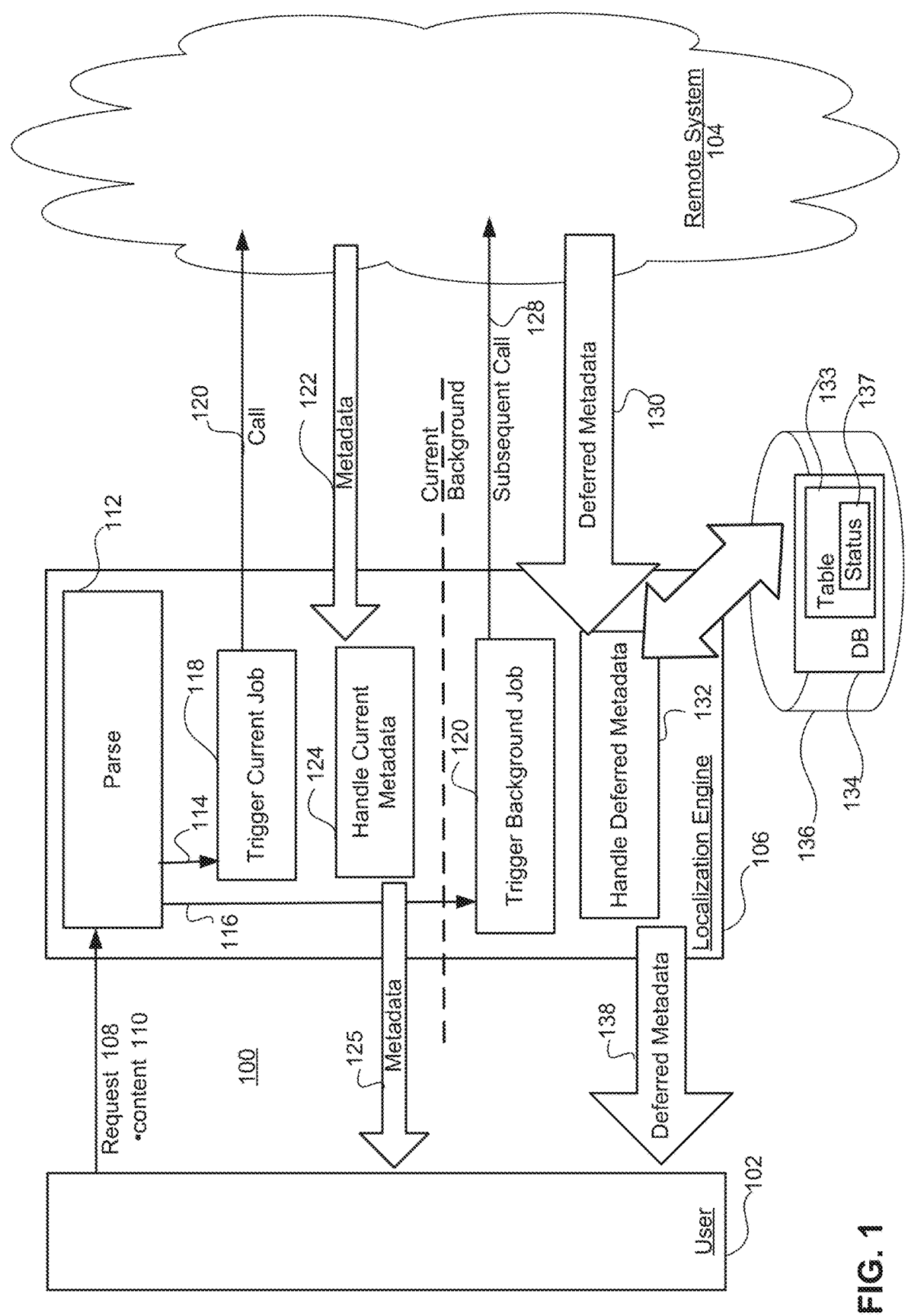
FIG. 1 shows a simplified diagram of a system according to an embodiment.

FIG. 1 shows a simplified view of an example system that is configured to implement localized metadata handling according to an embodiment. Specifically, system 100 comprises a user 102 in communication with a remote system 104 via a localization engine 106.

The user seeks to retrieve data from the remote system. In particular, the user poses a request 108 including content 110. In one possible example involving language translation, the user poses a request in the form of a database query, which includes content in the form of a locale of the user.

The request is received by the localization engine. The localization engine recognizes the content of the request (e.g., a specific locale from a profile of the user).

In response to the recognized content, the localization engine parses 112 the request into two parts:
 a first portion 114 calling for an immediate response; and
 a second portion 116 whose response can be deferred.

Initially, the localization engine handles the first portion by triggering 118 a current job 120 that calls to the remote system. In response, the remote system returns to the localization engine, metadata 122 that is relevant only to the current job.

The localization engine then handles 124 that metadata by returning 125 it to the user according to the current job. In this manner, the user is rapidly provided with a response to the request.

While the current job is pending, the localization engine handles the second metadata portion by triggering 126 a background job 128 that subsequently calls the remote system. The remote system then returns deferred metadata 130 to the localization engine, that is relevant to the background job.

The localization engine handles 132 this deferred metadata by storing it locally—e.g., in a table 133 of database 134 in a non-transitory computer readable storage medium 136. In this manner, the deferred metadata may be accumulated locally over time for rapid access. This accumulation occurs without interference with efficient execution of the current job at the remote system.

The table also stores a job status 137. Ultimately, as execution of the background job is eventually completed, the deferred metadata also becomes available locally for access 138. In the particular example of a translation service discussed below, such deferred metadata could comprise metadata in human languages for locales other of the specific user issuing the request.

Figure 2:
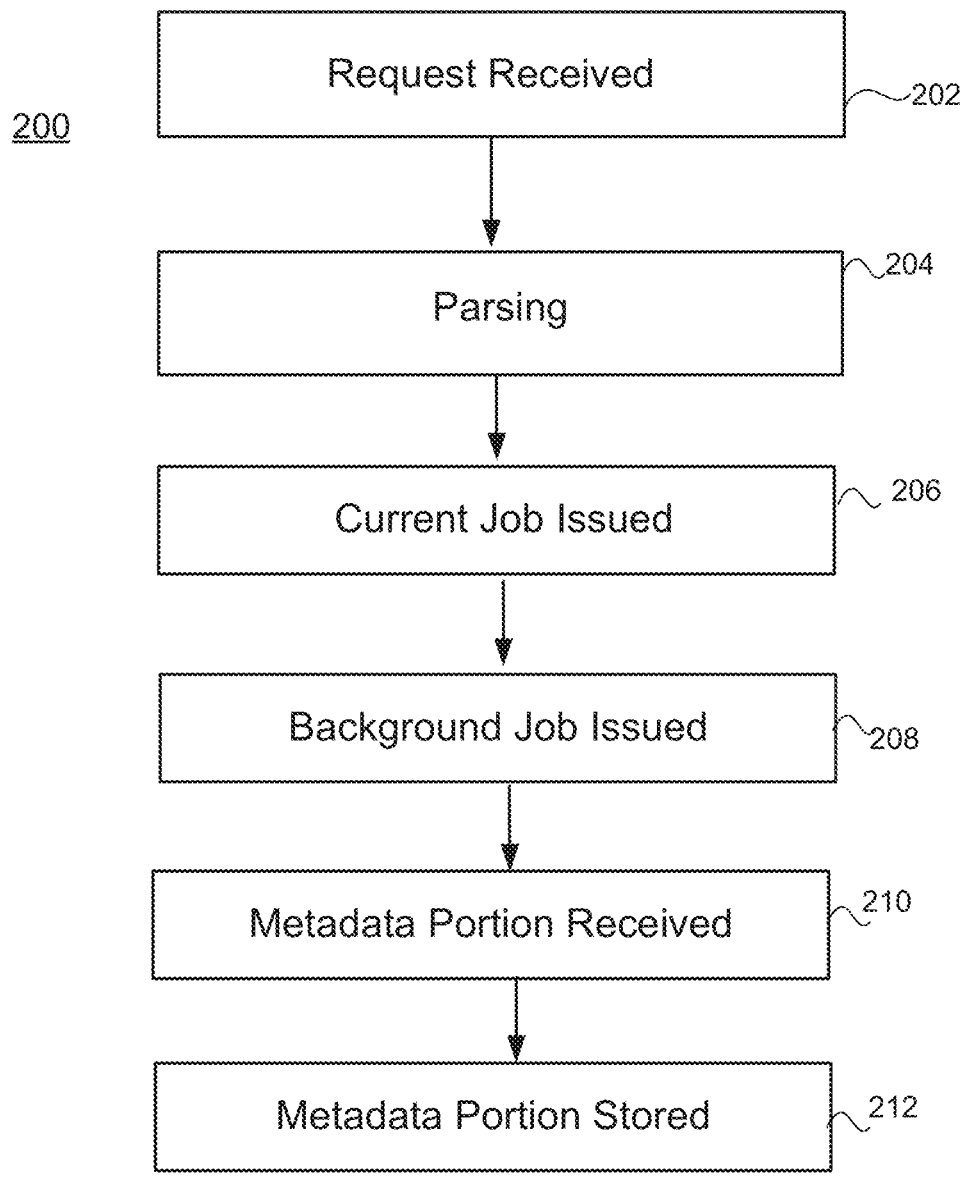
FIG. 2 shows a simplified flow diagram of a method according to an embodiment.

FIG. 2 is a flow diagram of a method 200 according to an embodiment. At 202, a request for metadata is received.

At 204, the request is parsed. At 206 a current job is issued.

At 208 a background job is issued. At 210, a metadata portion is received in response to the background job.

At 212, the metadata portion is stored.

Further details regarding metadata localization according to various embodiments, are now provided in connection with the following example. In this particular example, localized metadata handling is implemented in conjunction with:
- the SAP Analytics Cloud-SAC platform,
- the SAP Original Equipment Manufacturer (OEM) Integration Service-OIS, and
- the SAP HANA in-memory database, all of which are available from SAP SE of Walldorf, Germany, as well as with:
- a data source comprising an external SAP Line of Business (LOB) as a consumer.

EXAMPLE

Figure 3:
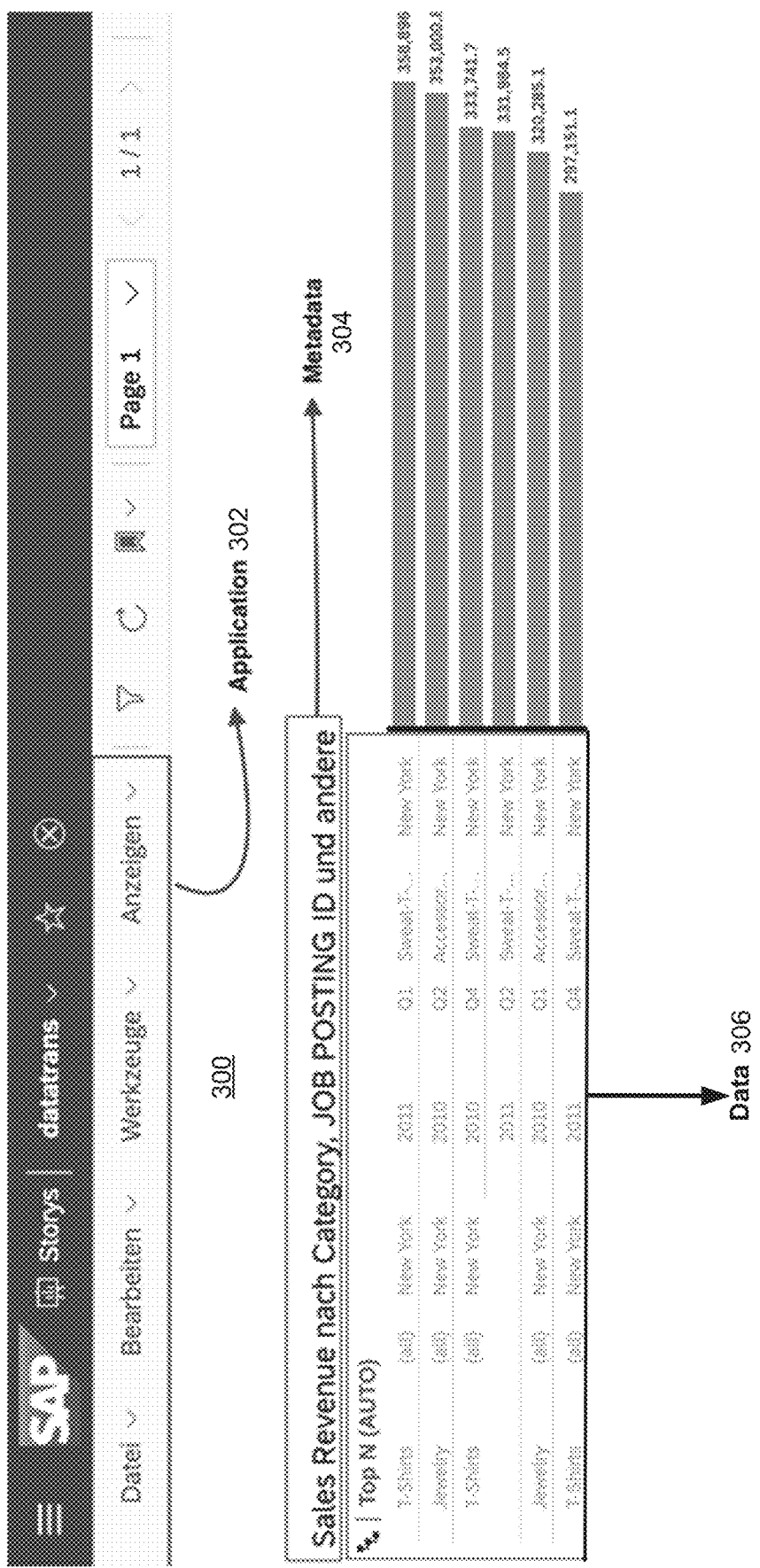
FIG. 3 shows a simplified screenshot of an application according to an example.

In this example, localization refers to support for different human languages for an analytical software application. FIG. 3 shows a simplified screen view 300 of the SAC analytics platform, appearing to a particular user having a current locale (e.g., Germany).

Such human languages for localization according to embodiments, could be any of the following types.
- Application (Dialogs, screens, others) 302:
- Metadata Translation 304; and
- Data translation 306.

Figure 4:
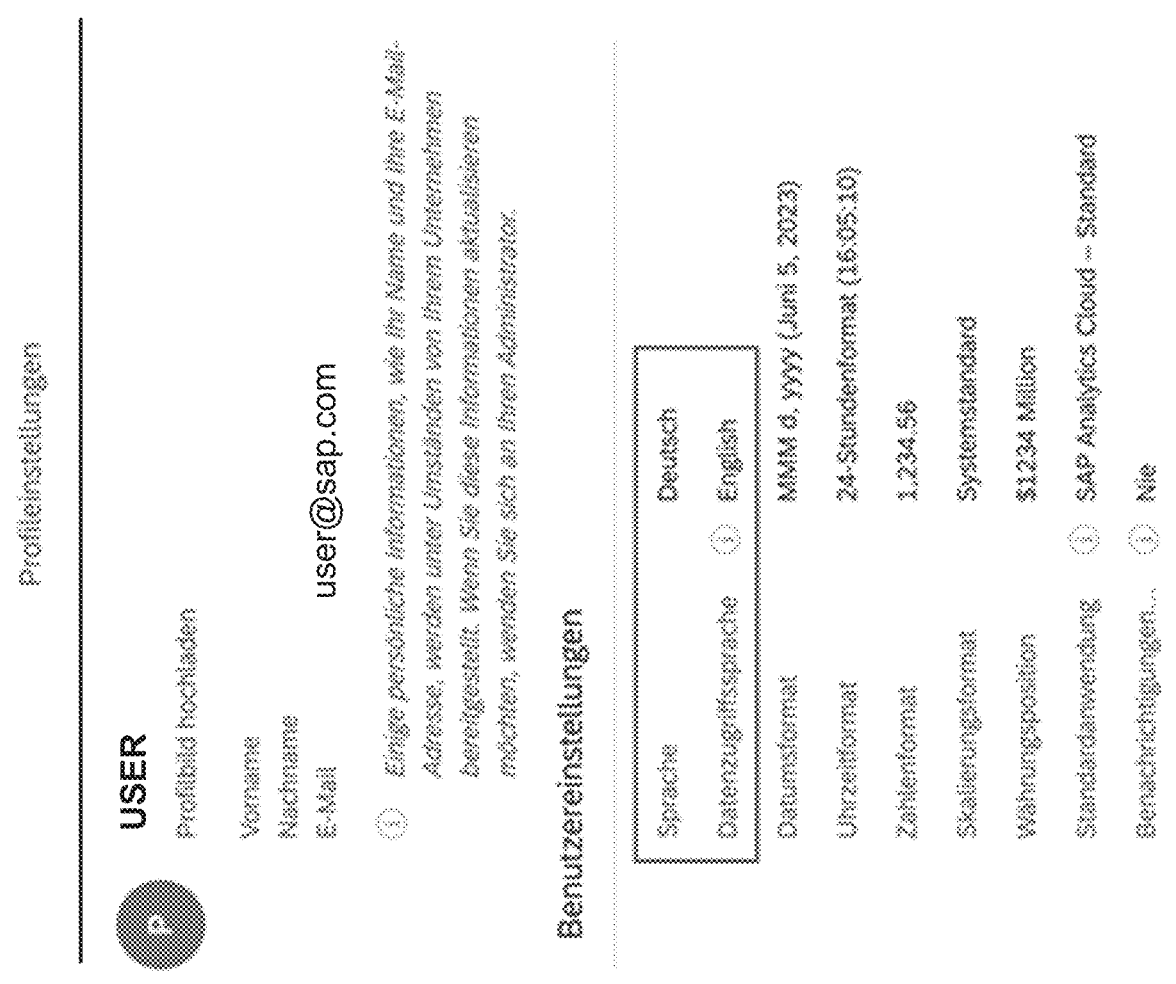

For the end user, translation into the appropriate human language is occurs by setting their language preference in the user profile settings of SAC. FIG. 4 shows a screen shot of setting such preferences.

Here, language is for application-level translation. Data Access Language is for analytical data translation. The application is now set to display the application and the data in the language designated by the user in the profile settings.

The language translation of metadata, is the subject of this specific example. In particular, metadata translation is further divided into the following two (2) types: design artifacts and runtime artifacts.
1. Design artifacts may be a group of data sources forming a domain or sub-groups. These are part of Query Designer—e.g., SAP Query Builder (QB) metadata translation.
2. Runtime artifacts may be measures or dimensions which are part of the data source. This is referred to herein as story runtime SAP INformation Access (INA) metadata translation.

Conventionally, each time an analytical story page is opened, for INA metadata translation an external call is made to the LOB API (consumer) to get the translation texts. Or, a data source artifact (like Table function) may be called to get the translations.

Such external calls represent an overhead. The external call(s) may impact performance if the story is being opened by multiple users at same time.

Accordingly, this example embodiment persists language translations in HANA, in order to avoid roundtrip external calls to the consumer API's for fetching the translations.

In particular, HANA supports a system table: BIMC_DESCRIPTIONS. This system table can store localized labels for the metadata of the calculation view.

This allows calling the API of the consumer LOB only once, in order to fetch these labels and deploy them to HANA at query creation time.

Then, at the runtime (i.e, story open time) these already-stored labels are fetched in HANA directly. This reduces overhead and desirably results in a reduction of the overall execution time.

Since HANA performs asynchronous additions into the BIMC_DESCRIPTIONS system table, the load on HANA with the incoming translation deployment requests would not be an issue.

It is noted that log deployments can give rise to performance issues. To avoid this, once the labels are fetched externally from the LOB, properties files are built which are deployed to HANA using API's of the HANA Deployment Infrastructure (HDI).

When the properties files are huge, and number of properties files is high, then ordinarily deployments may take a lot of time. This is due to sequential inserts made to DB.

The statements for the database within the same transaction are running in a serialized manner. It is an inherent feature of the database that statements cannot be run in parallel in the same transaction.

Since deployments are taken at the time of query design, the query call execution may increase. However, though runtime performance is improved, there may be degradation at query design time.

This issue is addressed by recognizing that at the design creation time, the user is only concerned with the localization of metadata for his or her current locale (e.g., Germany) as designated in the profile settings.

Thus, the experience of the user may not be disrupted, if during the query call we deploy only the localized data for the current user locale. Data for locales other than the current one, can later be deployed as part of a background job after the query call finishes.

The deployment of a single properties file does not take much time (e.g., <500 ms). So, query execution time may not be greatly impacted.

By the time the story is created and another user (having a different language preference) tries to open the story, the background job with the other deployments will have already been completed. Hence that other user will also not experience a delay.

Embodiments can also support localization in an alternative scenario for older stories or migrated stories (having no translations deployed). Whenever a user opens those stories for the first time, the translation upload process may be triggered. This may be accomplished in a manner similar to new story creation scenario, where deployment of current user locale labels happens during INA metadata call, and deployment of other locales occurs as part of an asynchronous call.

The two scenarios for metadata localization according to the example, are now listed in the following table.

| Scenario | Implementation | FIGS. |
| --- | --- | --- |
| Create calc view - New story | Active locale properties file is deployed within query call. Other locales are triggered later through a separate call (from UI), which will run in background. | 5; 6-6B |
| Old stories - No translations deployed earlier | Similar to create query. An active locale properties file is deployed within INA metadata call. The additional call here will be a self-call, made within the backend itself. | 5; 7-7B |

Figure 5:
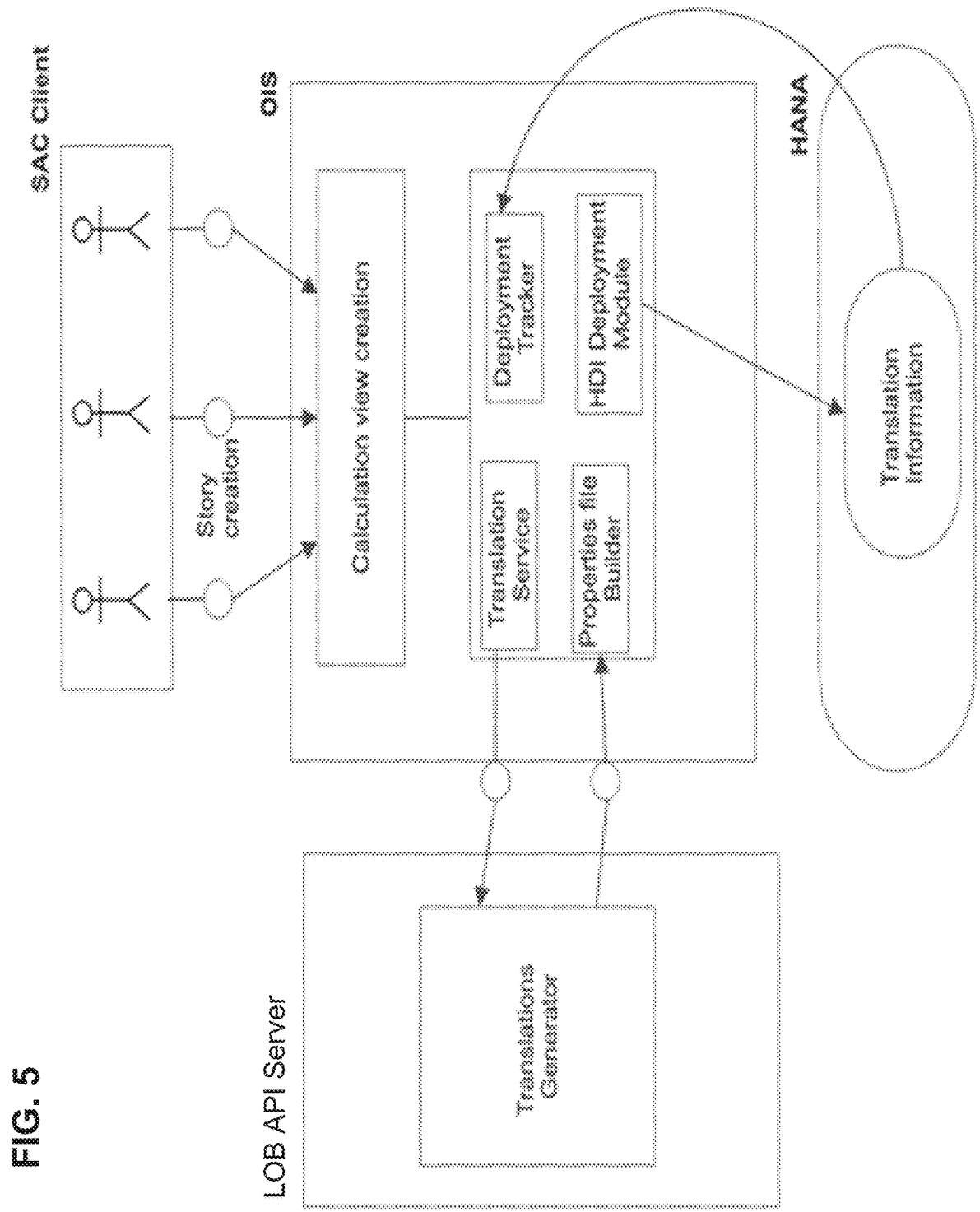
FIG. 5 shows an architecture of a system implementing metadata localization according to an example.

For this example, these scenarios are now illustrated in connection with the particular architecture shown in FIG. 5. For the first (new story) scenario, the SAC Client is understood to be the SAC Query Builder (SAC QB). For the second (old story) scenario, the SAC Client is understood to be the SAC Browser.

Figure 6A:
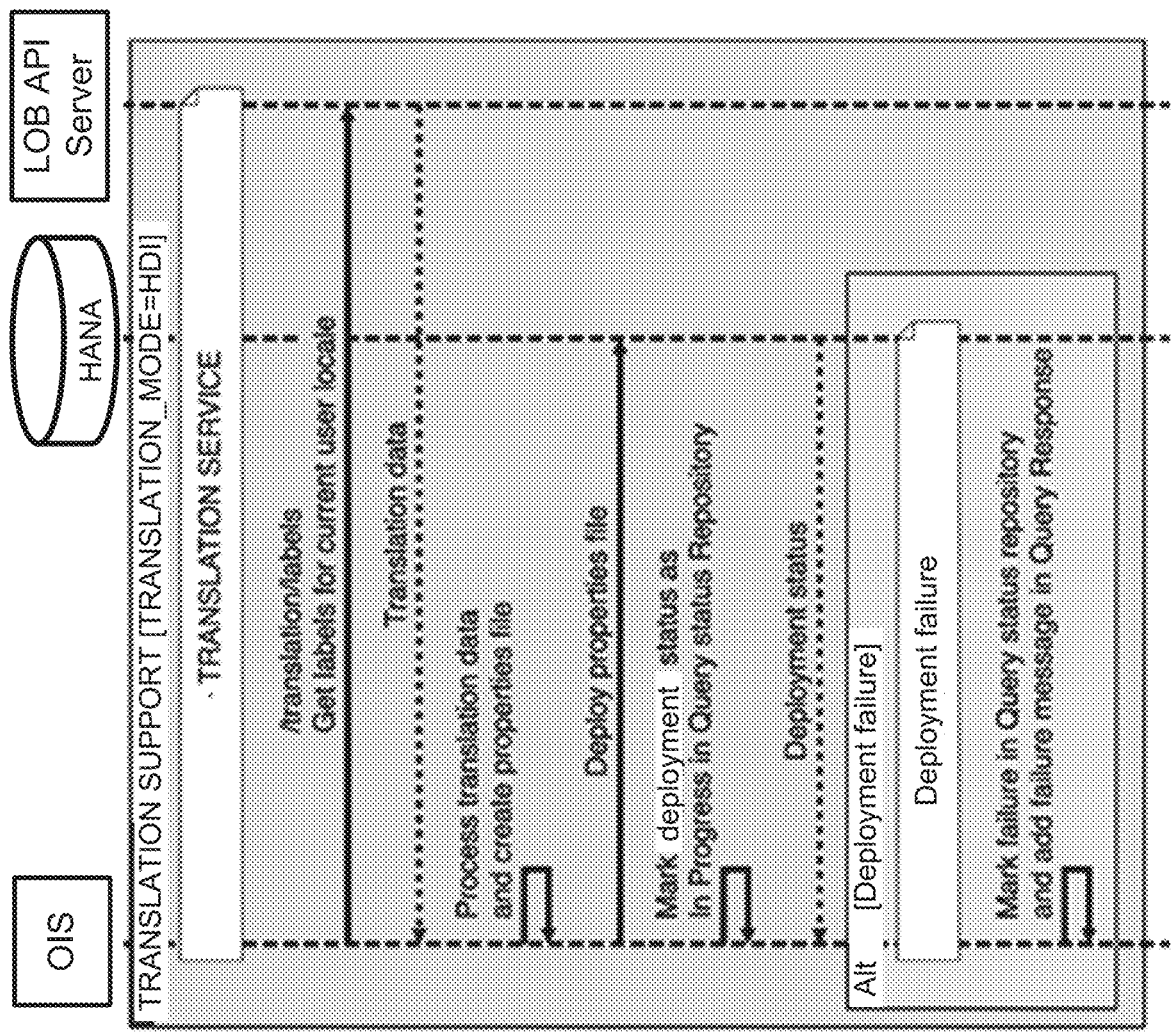
FIGS. 6A and 6B show detailed portions of the flow diagram of FIG. 6.
Figure 6B:
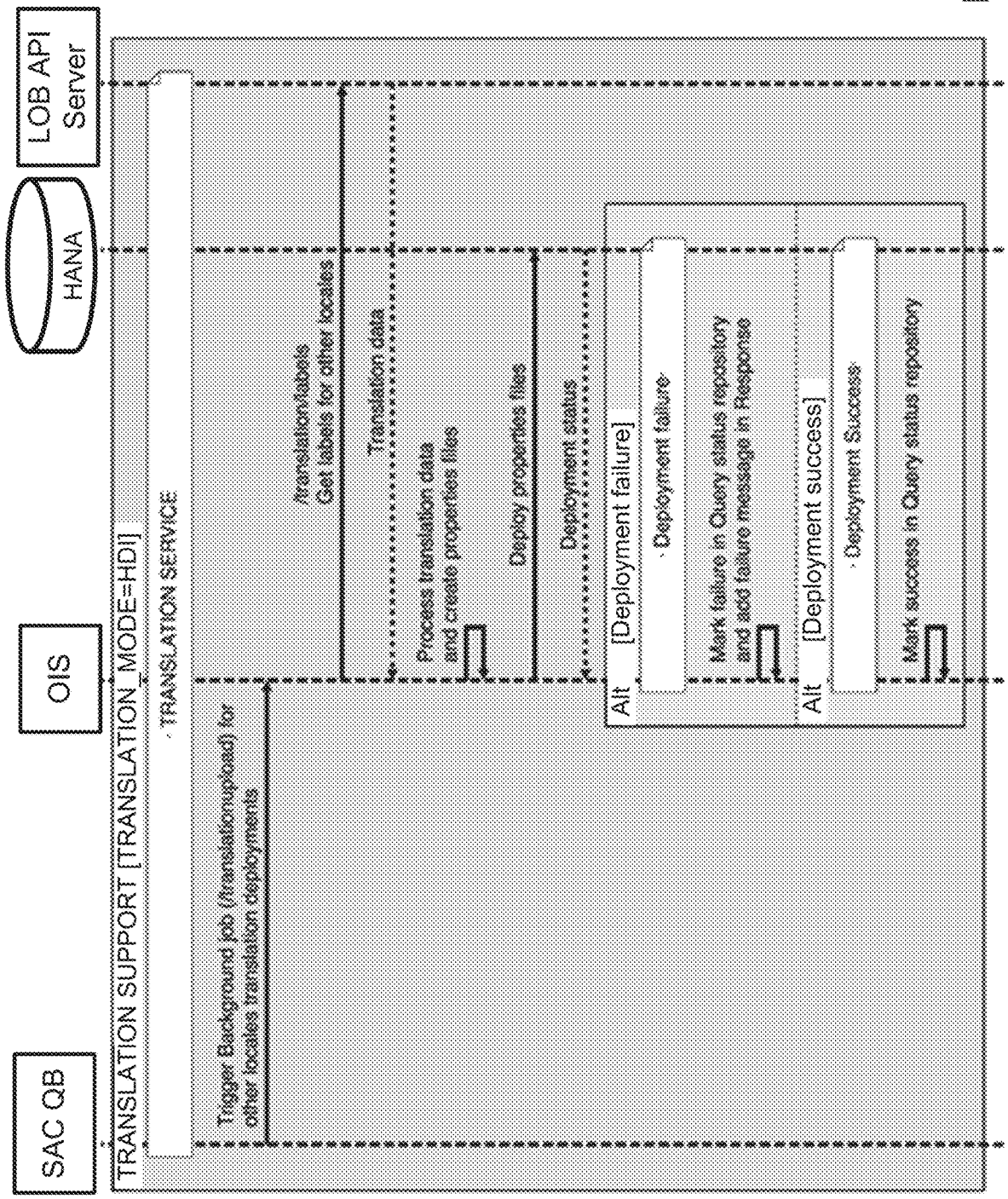

FIGS. 6-6B are sequence diagrams illustrating activity during design time for the first (new story) scenario above, according to the example. In particular, a/query call is made during story creation, once creation of the calculated view is successful.

Then, the API of the LOB is called to get the translation labels (for the current locale only) for the columns of the calculated view. A properties file including these translated labels, is generated for deployment to HANA using HDI API's. This is shown in FIG. 6A.

Once deployment is complete, the processed query response is returned. Also, the Query status repository is updated according to deployment status.

Where the previous deployment for single locale was successful, then from the UI trigger a background job (/translationupload), as shown in FIG. 6B. That background job is to deploy translations for remaining locales that the LOB maintains.

The procedure for remaining labels will be as current locale, i.e.:

calling LOB API→generating properties files→deploying these→updating the Query Status repository.

Thus under the first scenario, at story (runtime/open/view) no translations deployment workflow needs to be performed. The translations are already deployed in HANA (during design time) and the translations are automatically obtained from HANA without having to interact with LOB server. This avoids a potential bottleneck in performance, as if story view were to be done by many users in parallel in different locales, the LOB API would need to be externally called to get the translations for each user locale.

By contrast, for the second (old story) scenario, the story has already been created during a previous design time. Hence, metadata localization occurs during story runtime.

Figure 7:
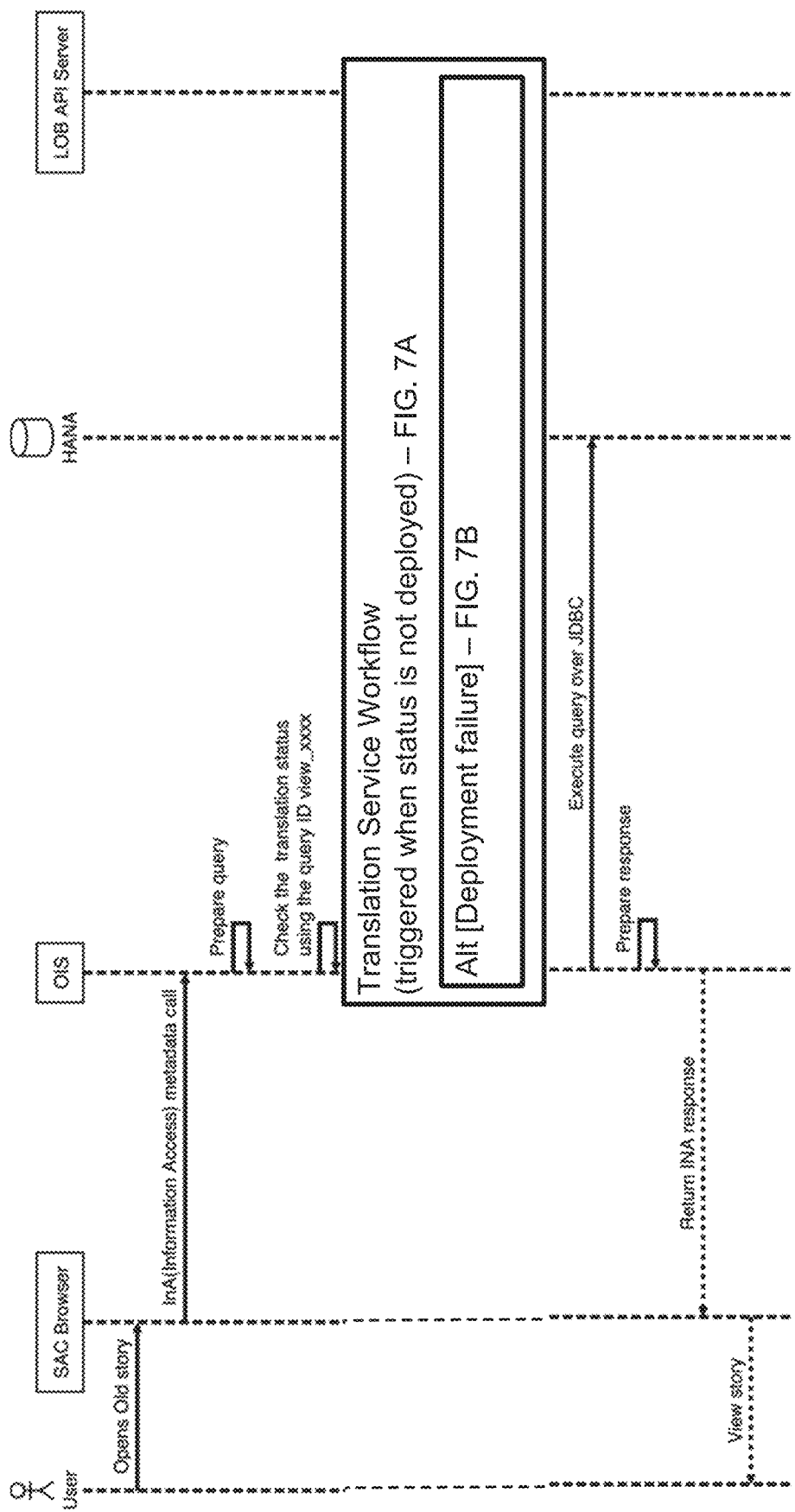
FIG. 7 is a simplified flow diagram for metadata localization under another scenario according to the example.
Figure 7A:
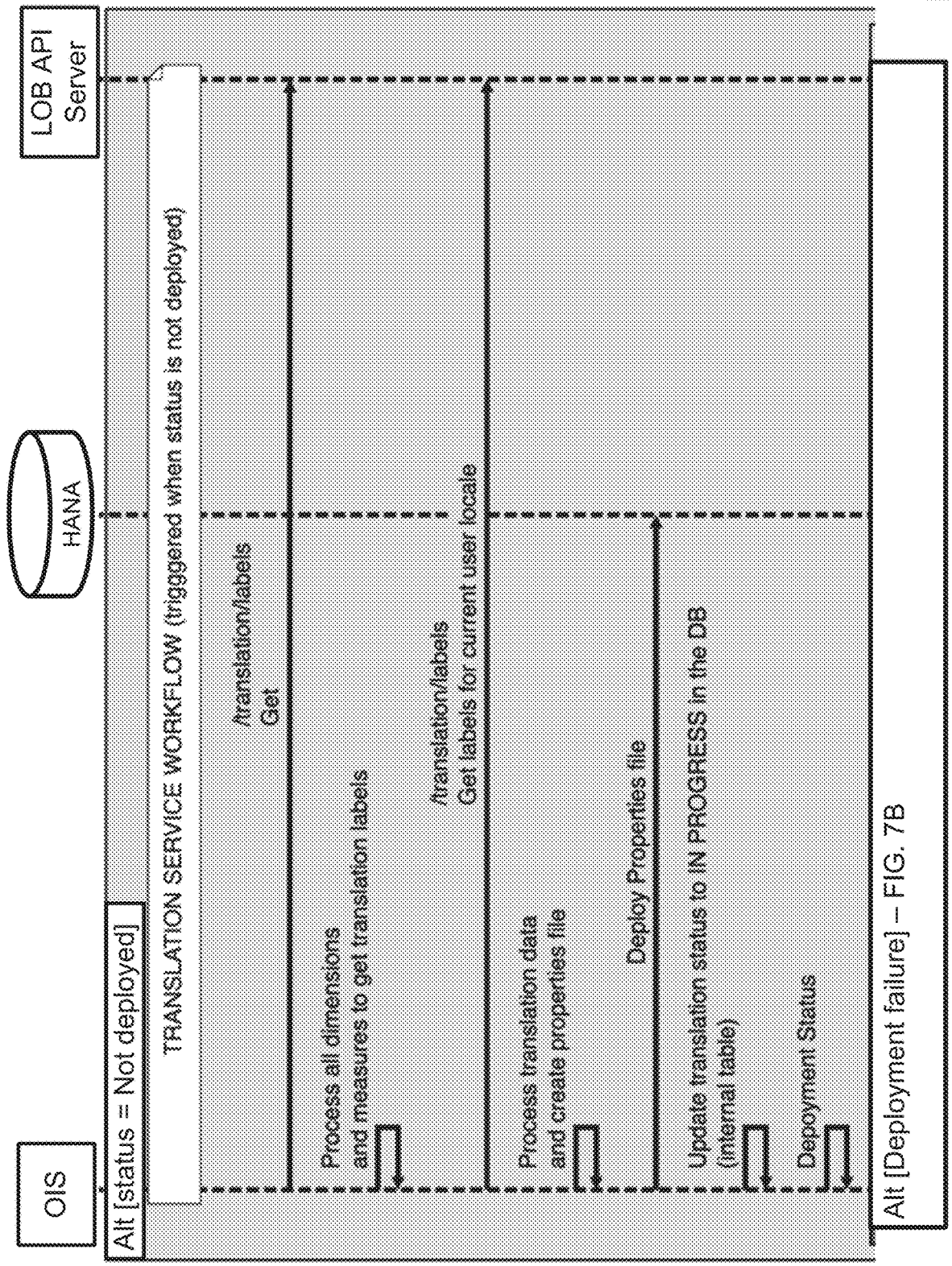
FIGS. 7A and 7B show detailed portions of the flow diagram of FIG. 7.
Figure 7B:
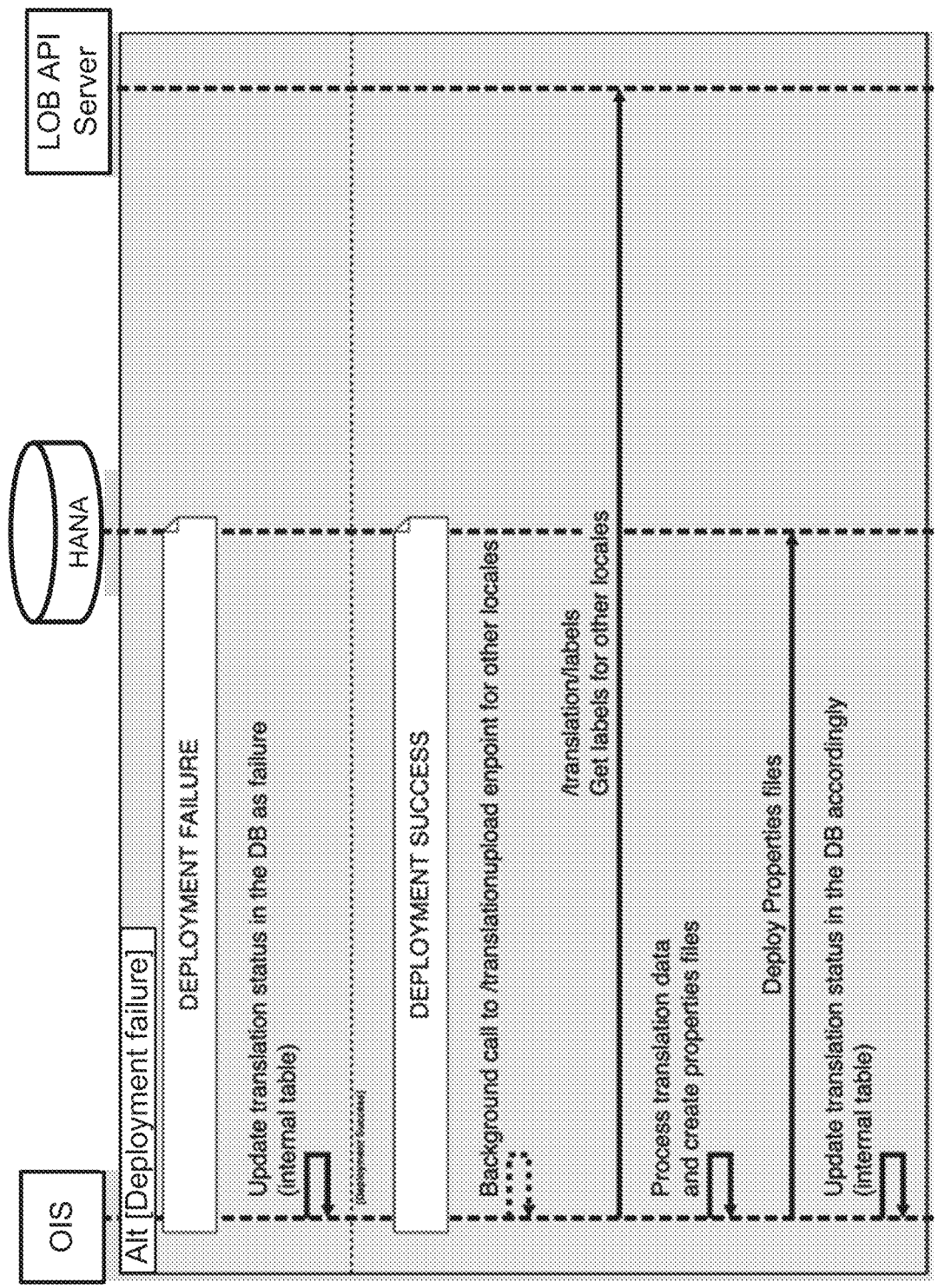

In particular, for older stories/migration scenarios where the translation deployment did not happen during design time, the translation deployment workflow is triggered once—at a time the story is first opened. FIGS. 7A-B show sequence diagrams for story runtime according to such a second scenario.

For an INA metadata call made during story open, translation upload status (e.g., •Successful: •In Progress; •Failure: •No record) is checked from Query status repository for the corresponding calculation view. The translation upload is triggered in case of: •Failure or •No record (translation never happened).

First, call the LOB API to get the translation labels for the columns of the calculation view (only for current user locale). Then, generate a properties file containing these translated labels to be deployed to HANA using HDI API's. This is shown in FIG. 7A. Once deployment is complete, the Query status repository is updated according to deployment status.

Where the previous deployment for single locale was successful, then do an asynchronous self call to (/translationupload) endpoint, as shown in FIG. 7B. This will deploy translations in the background for remaining locales that LOB maintains. Meanwhile, the INA metadata call for the current user locale will complete its execution and return.

The procedure for remaining labels will be same as current locale, i.e.:

calling LOB API→generating properties files→deploying these→updating the Query Status repository.

FIG. 8 shows a table structure for the query status repository according to the example. FIG. 9 shows a table structure for a translation scenario.

Localized metadata handling according to embodiments, may offer one or more benefits. Specifically, one possible benefit is higher performance.

Specifically, by allocating the retrieve of some metadata to a background (rather than current) job, communication with the remote source does not serve as a bottleneck to satisfying the current job. This enhances speed and performance.

Another possible benefit is flexibility. As described in connection with the specific language translation example, embodiments may operate during either design time or runtime, depending upon the circumstances. In this manner embodiments may be employed in a variety of situations.

Returning now to FIG. 1, there the particular embodiment is depicted with the localization engine as being located outside of the database. However, this is not required.

Rather, alternative embodiments could leverage the processing power of an in-memory database engine (e.g., the in-memory database engine of the HANA in-memory database available from SAP SE), in order to perform one or more various functions as described above.

Figure 10:
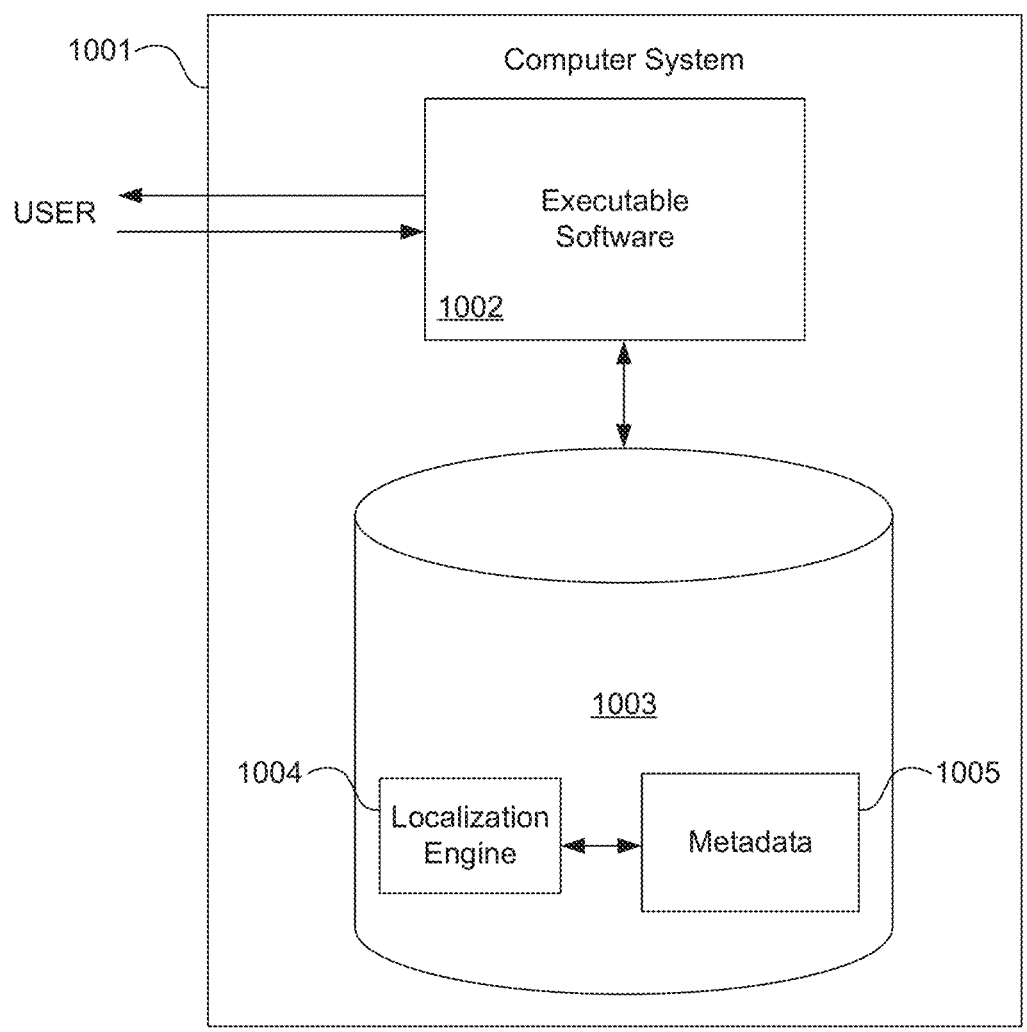
FIG. 10 illustrates hardware of a special purpose computing machine configured to implement metadata localization according to an embodiment.

Thus FIG. 10 illustrates hardware of a special purpose computing machine configured to perform localized metadata handling according to an embodiment. In particular, computer system 1001 comprises a processor 1002 that is in electronic communication with a non-transitory computer-readable storage medium comprising a database 1003. This computer-readable storage medium has stored thereon code 1005 corresponding to a localization engine. Code 1004 corresponds to metadata. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented systems and methods comprising:

receiving at a location, a request for metadata to be provided from a remote location, the request including content:

in response to the content, parsing the request into a current job for a first portion of the metadata, and a background job for a second portion of the metadata:

at a first time, issuing the current job to retrieve the first portion of the metadata from the remote location;

at a second time subsequent to the first time, issuing the background job to retrieve the second portion of the metadata from the remote location;

in response to the background job, receiving the second portion of the metadata at the location; and storing the second portion of the metadata in a non-transitory computer readable storage medium at other than the remote location.

Example 2. The computer implemented systems or methods of Example 1 wherein the request comprises a query formulation request executed during a design time.

Example 3. The computer implemented systems or method of Example 1 wherein the request comprises a query executed during a runtime.

Example 4. The computer implemented systems or methods of Example 3 wherein the second metadata portion comprises a measure or a dimension at the remote location.

Example 5. The computer implemented systems or methods of any of Examples 3 or 4 wherein the background job comprises a self call.

Example 6. The computer implemented systems or methods of any of Examples 1, 2, 3, 4, or 5 wherein:
the request is sent from a user; and the content indicates a locale of the user.

Example 7. The computer implemented systems or methods of Example 6 wherein:
the first metadata portion is in a first human language according to the locale; and the second metadata portion is in a second human language according to other than the locale.

Example 8. The computer implemented systems or methods of any of Examples 1, 2, 3, 4, 5, 6, or 7 further comprising recording a job status the non-transitory computer readable storage medium.

Example 9. The computer implemented systems or methods of Example 8 wherein:
the second portion of the metadata is stored in a relational database table of the non-transitory computer readable storage medium; and
the job status is recorded in the relational database table Example 10. The computer implemented systems or methods of any of Examples 1, 2, 3, 4, 5, 6, 7, 8, or 9 wherein:
the non-transitory computer readable storage medium comprises an in-memory database; and an in-memory database engine of the in-memory database performs the parsing.

Figure 11:
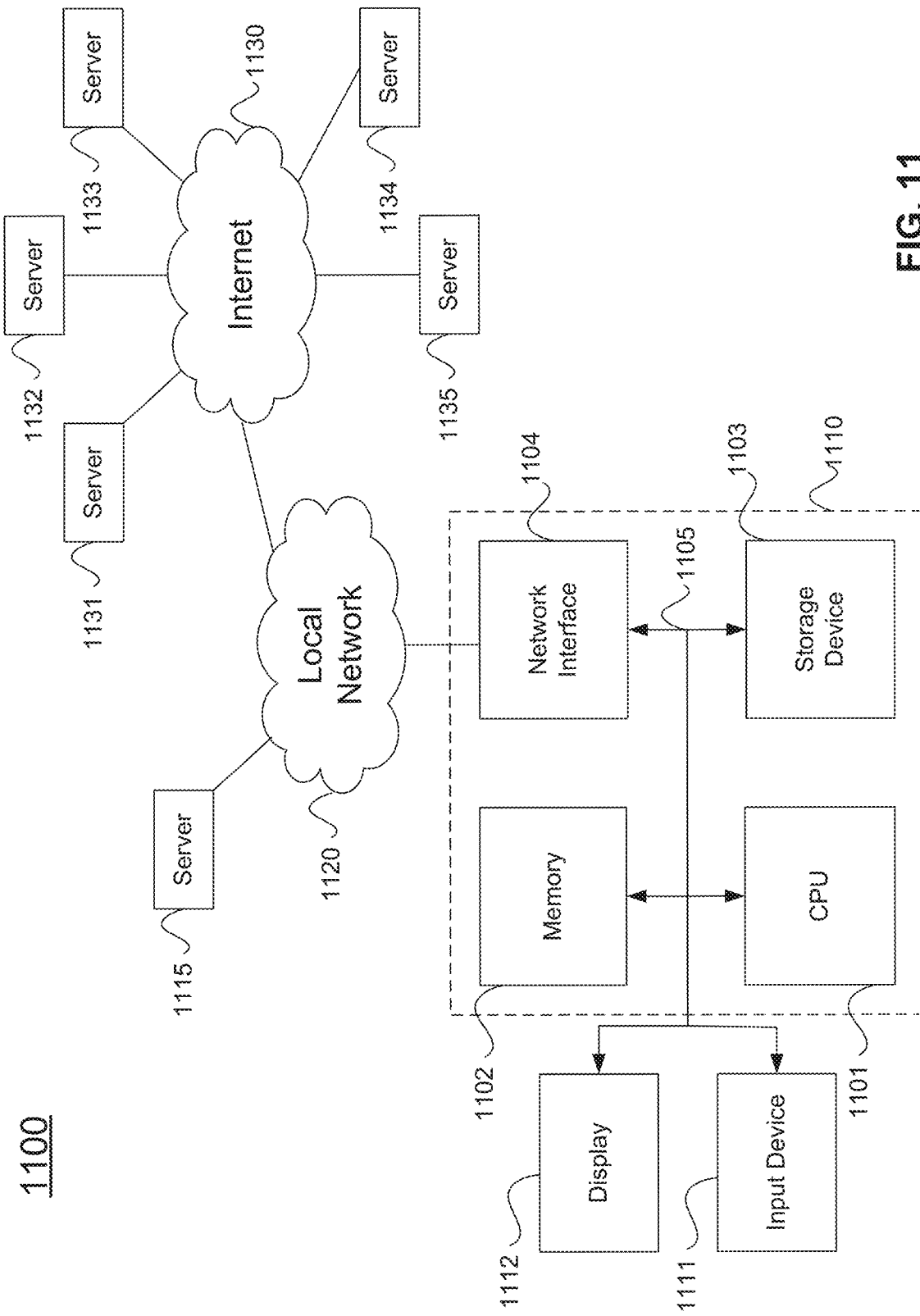
FIG. 11 illustrates an example computer system.

An example computer system 1100 is illustrated in FIG. 11. Computer system 1110 includes a bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1103 may include source code, binary code, or software files for performing the techniques above, for example. Storage device and memory are both examples of computer readable mediums.

Computer system 1110 may be coupled via bus 1105 to a display 1112, such as a Light Emitting Diode (LED) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface z04 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 1110 and server computer systems represented by server 1115 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 1104 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving, from a user at a first location, a request for metadata;
parsing the request into a current job for a first portion of the metadata and a background job for a second portion of the metadata, wherein parsing the request comprises determining the first portion of the metadata corresponding to a first language specified in a profile of the user and a second portion of the metadata corresponding to a plurality of other languages not specified in the profile of the user;
at a first time, issuing the current job to retrieve the first portion of the metadata from a translation server;
at a second time subsequent to the first time and upon completion of the current job, issuing the background job to retrieve the second portion of the metadata from the translation server;

in response to the background job, receiving a translation of the second portion of the metadata into the plurality of other languages; and storing the translation of the second portion of the metadata in a non-transitory computer readable storage medium, wherein, upon receiving a second request for metadata from a second user associated with a second profile having language preferences specifying one of the plurality of other languages, at least a portion of the translation of the second portion of the metadata is retrieved and presented to the second user.

2. A method as in claim 1 wherein the request comprises a query formulation request executed during a design time.

3. A method as in claim 1 wherein the request comprises a query executed during a runtime.

4. A method as in claim 3 wherein the second metadata portion comprises a measure or a dimension at the remote location.

5. A method as in claim 3 wherein the background job comprises a self call.

6. A method as in claim 1 further comprising recording a job status the non-transitory computer readable storage medium.

7. A method as in claim 6 wherein:
the job status is recorded in the relational database table, wherein when the job status indicates the background job is completed, and wherein when the background job is completed the second metadata portion becomes available for access.

8. A method as in claim 1 wherein:
the non-transitory computer readable storage medium comprises an in-memory database; and
an in-memory database engine of the in-memory database performs the parsing.

9. A method as in claim 1 wherein the translation of the second portion of the metadata is stored asynchronously in a table of a database in the non-transitory computer readable storage medium.

10. A method as in claim 1 wherein the request is a database query.

11. A non-transitory computer readable storage medium embodying a computer program for performing a method, said method comprising:
receiving, from a user at a first location, a request for metadata;
parsing the request into a current job for a first portion of the metadata and a background job for a second portion of the metadata, wherein parsing the request comprises determining the first portion of the metadata corresponding to a first language specified in a profile of the user and a second portion of the metadata corresponding to a plurality of other languages not specified in the profile of the user;
at a first time, issuing the current job to retrieve the first portion of the metadata from a translation server;
at a second time subsequent to the first time and upon completion of the current job, issuing the background job to retrieve the second portion of the metadata from the translation server;
in response to the background job, receiving a translation of the second portion of the metadata into the plurality of other languages; and
storing the translation of the second portion of the metadata in a non-transitory computer readable storage medium,
wherein, upon receiving a second request for metadata from a second user associated with a second profile having language preferences specifying one of the plurality of other languages, at least a portion of the translation of the second portion of the metadata is retrieved and presented to the second user.

12. A non-transitory computer readable storage medium as in claim 11 wherein the request comprises a query formulation request executed during a design time.

13. A non-transitory computer readable storage medium as in claim 11 wherein the request comprises a query executed during a runtime.

14. A computer system comprising:
one or more processors;
a software program, executable on said computer system, the software program configured to:
receiving, from a user at a first location, a request for metadata;
parse the request into a current job for a first portion of the metadata and a background job for a second portion of the metadata, wherein parsing the request comprises determining the first portion of the metadata corresponding to a first language specified in a profile of the user and a second portion of the metadata corresponding to a plurality of other languages not specified in the profile of the user;
at a first time, issue the current job to retrieve the first portion of the metadata from a translation server;
at a second time subsequent to the first time and upon completion of the current job, issue the background job to retrieve the second portion of the metadata from the translation server;
in response to the background job, receive a translation of the second portion of the metadata into the plurality of other languages; and
store the translation of the second portion of the metadata in a non-transitory computer readable storage medium,
wherein, upon receiving a second request for metadata from a second user associated with a second profile having language preferences specifying one of the plurality of other languages, at least a portion of the translation of the second portion of the metadata is retrieved and presented to the second user.

15. A computer system as in claim 14 wherein the request comprises a query formulation request executed during a design time.

16. A computer system as in claim 14 wherein the request comprises a query executed during a runtime.

17. A computer system as in claim 14 wherein the software program is further configured to record a job status in the in-memory database.

* * * * *